United States Patent
Lin (10) Patent No.: US 12,463,245 B2
(45) Date of Patent: Nov. 4, 2025

(54) HIGH VOLTAGE ELECTROLYTE FOR 5V SOLID STATE LITHIUM-ION BATTERY CELL

(71) Applicant: SOLID ENERGIES INC., Garden Grove, CA (US)

(72) Inventor: Zhigang Lin, Garden Grove, CA (US)

( * ) Notice: Subject to any disclaimer, the term of this patent is extended or adjusted under 35 U.S.C. 154(b) by 489 days.

(21) Appl. No.: 17/942,095

(22) Filed: Sep. 9, 2022

(65) Prior Publication Data

US 2023/0013068 A1    Jan. 19, 2023

Related U.S. Application Data

(63) Continuation-in-part of application No. 17/140,690, filed on Jan. 4, 2021, now Pat. No. 11,588,176.

(51) Int. Cl.

| | |
|---|---|
| H01M 10/056 | (2010.01) |
| H01M 10/0525 | (2010.01) |
| H01M 10/0585 | (2010.01) |
| H01M 50/414 | (2021.01) |
| H01M 50/497 | (2021.01) |

(52) U.S. Cl.
CPC ..... *H01M 10/056* (2013.01); *H01M 10/0525* (2013.01); *H01M 10/0585* (2013.01); *H01M 50/414* (2021.01); *H01M 50/497* (2021.01); *H01M 2300/0071* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

| | | |
|---|---|---|
| 5,319,517 A | 6/1994 | Nomura |
| 5,728,489 A | 3/1998 | Gao et al. |
| 5,834,136 A | 11/1998 | Gao |
| 5,964,903 A | 10/1999 | Gao et al. |
| 6,020,087 A | 2/2000 | Gao |
| 6,072,688 A | 6/2000 | Hennings |
| 6,156,458 A | 12/2000 | Brodd et al. |
| 6,432,581 B1 | 8/2002 | Amatucci et al. |
| 6,451,480 B1 | 9/2002 | Gustafson et al. |
| 6,479,073 B1 | 11/2002 | Lucast |
| 6,596,440 B2 | 7/2003 | Gavelin et al. |
| 6,905,762 B1 | 6/2005 | Jow et al. |
| 7,166,366 B2 | 1/2007 | Moser |
| 7,604,892 B2 | 10/2009 | Yoo |
| 7,935,442 B2 | 5/2011 | Kim |
| 8,198,783 B2 | 6/2012 | Bayer et al. |
| 9,548,514 B2 | 1/2017 | Kyu et al. |
| 9,673,447 B2 | 6/2017 | Chen |
| 9,819,053 B1 | 11/2017 | Zimmerman |
| 10,122,046 B2 | 11/2018 | Abraham |
| 10,297,874 B2 | 5/2019 | Omori |
| 10,581,119 B2 | 3/2020 | Haladay |
| 11,223,088 B2 | 1/2022 | Lin |
| 11,588,176 B2 | 2/2023 | Lin et al. |
| 11,967,678 B2 | 4/2024 | Lin et al. |
| 12,142,766 B2 * | 11/2024 | Lin ............... H01M 4/483 |
| 2001/0020084 A1 | 9/2001 | Aoki et al. |
| 2003/0062257 A1 | 4/2003 | Gozdz |
| 2005/0287441 A1 | 12/2005 | Passerini et al. |
| 2006/0247364 A1 | 11/2006 | Murray et al. |
| 2009/0191455 A1 | 7/2009 | Gao et al. |
| 2011/0045355 A1 | 2/2011 | Ichikawa |
| 2011/0281160 A1 | 11/2011 | Doi |
| 2014/0199598 A1 | 7/2014 | Hoshina et al. |

(Continued)

FOREIGN PATENT DOCUMENTS

| | | | |
|---|---|---|---|
| CN | 1197184 C | * 4/2005 | .......... H01M 10/052 |
| CN | 106941190 A | 7/2017 | |

(Continued)

OTHER PUBLICATIONS

Machine translation of CN 109411809 A, published on Mar. 1, 2019 (Year: 2019).*

(Continued)

*Primary Examiner* — Anca Eoff (57) ABSTRACT

High voltage, high-ionic-conductivity, fire resistant solid-state polymer electrolytes include poly(vinylidene fluoride-co-hexafluoropropylene) P(VDF-HFP), sulfolane plasticizer, lithium salt, and ceramic nanoparticles with the basic formula $Li_7La_3Zr_2O_{12}$ (LLZO) and derivatives thereof. During the curing process, the presence of the LLZO nanoparticles prevent the P(VDF-HFP) from developing into a crystalline phase. In the electrolyte formed, the P(VDF-HFP) is in an amorphous phase with LLZO nanoparticles, lithium salt and sulfolane distributed in the polymer matrix. The solid-state electrolyte with the amorphous polymer phase exhibit higher ionic conductivities than those having a crystalline polymer phase. The LLZO contributes to mechanical properties of the electrolyte and also function as tough ceramic fillers that inhibit lithium dendrite growth during operation of lithium-ion cells and batteries. 5V all-solid-state lithium-ion batteries incorporated the electrolytes exhibit high energy densities (250-350 Whr/kg), high power densities (high discharge rate up to 5 C) and long service lives (500-1500 cycles, <2% irreversible loss/month).

18 Claims, 10 Drawing Sheets

(56) References Cited

U.S. PATENT DOCUMENTS

| | | | |
|---|---|---|---|
| 2015/0349379 A1* | 12/2015 | Hozumi | H01M 10/0562 |
| | | | 429/304 |
| 2016/0329539 A1 | 11/2016 | Kawaji et al. | |
| 2017/0162901 A1 | 6/2017 | Chen et al. | |
| 2017/0278643 A1 | 9/2017 | El-Kady | |
| 2018/0062160 A1 | 3/2018 | Kasamatsu et al. | |
| 2018/0138545 A1 | 5/2018 | Aburatani et al. | |
| 2019/0058211 A1 | 2/2019 | Yang | |
| 2019/0305314 A1 | 10/2019 | Oyama et al. | |
| 2019/0319262 A1 | 10/2019 | Zhamu et al. | |
| 2020/0067128 A1* | 2/2020 | Chmiola | H01M 4/36 |
| 2020/0144665 A1 | 5/2020 | Huang et al. | |
| 2020/0335814 A1 | 10/2020 | Lin | |
| 2022/0376255 A1 | 11/2022 | Lin et al. | |

FOREIGN PATENT DOCUMENTS

| | | | |
|---|---|---|---|
| CN | 108140883 A | 6/2018 | |
| CN | 109411809 A * | 3/2019 | H01M 10/0525 |
| CN | 111710817 A | 9/2020 | |
| JP | 2015002053 A * | 1/2015 | |
| WO | 2018089430 A1 | 5/2018 | |

OTHER PUBLICATIONS

Machine translation of JP 2015/002053 A, published in Jan. 5, 2015 (Year: 2015).*

Machine translation of CN 1197184 C, published on Apr. 13, 2005 (Year: 2005).*

Huo, H; Li, X.; Chen, Y.; Kiang, J.; Deng, S.; Gao, X.; Doyle-Davis, K; Li, R.; Guo, X.; Shen, Y.; Nan, C.-W.; Sun, X.—Bifunctional composite separator with a solid-state-battery strategy for dendrite-free lithium metal batteries, Energy Storage Materials 29 (2020) pp. 361-366 (Year: 2020).*

Gonzalez, F., et al., "Synergy of Inorganic Fillers in Composite Thermoplastic Polymer/Ionic Liquid/LiTFSi Electrolytes," Journal of the Electrochemical Society, 2020, 167, 070519.

Miwa, K., et al., "Molecular dynamics simulations with machine learning potential for Nb-doped lithium garnet-type oxide $Li_{7-x}La_3(Zr_{2-x}Nb_x)O_{12}$," Physical Review Materials 2, 2018, 105404.

\* cited by examiner

HIGH VOLTAGE ELECTROLYTE FOR 5V SOLID STATE LITHIUM-ION BATTERY CELL

CROSS REFERENCE TO RELATED APPLICATIONS

This application is a continuation-in-part application of pending U.S. application Ser. No. 17/140,690, filed Jan. 4, 2021 by Lin et al.

INCORPORATION BY REFERENCE

The descriptive matter of the above-referred to U.S. application Ser. No. 17/140,690 is incorporated herein by reference in its entirety and is made part of this application.

The invention was made with Government Support under SBIR Contract No. W56KGU-20-C-0038 awarded by the Tactical Power Branch, Power Division C5ISR Center, CP&I U.S. Army to Bioenno Tech LLC.

FIELD OF THE INVENTION

The present invention generally relates to lithium-ion batteries and, more particularly, to high-voltage, high-ionic-conductivity solid-state polymer composite electrolytes that exhibit superior voltage characteristics (typically at nominally 5V per cell) and which are particularly suited for lithium all-solid-state electrochemical cells and batteries.

BACKGROUND OF THE INVENTION

Lithium-ion batteries are used to power a wide range of facilities from portable devices to electric vehicles. The increasing throughput in electric-powered devices and vehicles requires batteries to supply more energy with the same or even smaller volumes.

Non-aqueous lithium electrochemical cells typically include an anode, a lithium electrolyte prepared from a lithium salt dissolved in one or more organic solvents, and a cathode of an electrochemically active material. Organic solvents, which are generally flammable and toxic, are added for solvating the lithium salt which provides mobile ions. During the electrochemical discharge process lithium ions are transported through the electrolyte from the anode to the cathode. As lithium ions are taken up by the cathode, there is a simultaneous release of electrical energy.

Solid-State electrolytes (SSE) have replaced conventional organic liquid electrolytes, however, current batteries with SSEs exhibit relatively low nominal voltages of approximately 3.2-3.7V per/cell and low usable energy densities. These deficiencies are due to the low ionic conductivities of current SSEs, which are not capable of working at high voltages above 4.5V.

SUMMARY OF THE INVENTION

The present invention is based in part on the development of a high-ionic-conductivity, non-flammable, solid-state electrolyte (SSE) for lithium-ion batteries. The solid-state electrolyte can be employed in high-energy, high-power 5V all-solid-state Li-ion batteries (ASSLiB$_S$), which can also operate safely over a wide temperature range.

In one aspect, the invention is directed to a polymer composite based solid-state electrolyte (SSE) for all solid-state lithium-ion electrochemical cells and batteries. The SSE includes (i) a P(VDF-HFP) polymer matrix, (ii) a plasticizer that comprises sulfolane (SL), (iii) a lithium salt, and (iv) ceramic nanoparticles with diameters that range from 10 to 2000 nm that are distributed in the polymer matrix, wherein the ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$.

The higher nominal voltage of 5V per/cell achieved with electrochemical cells of the present invention enhances the nominal discharge rate per/cell of lithium batteries. Electrochemical cells and batteries incorporating the inventive SSE will exhibit high energy densities of preferably from 250-350 Wh/kg and power densities of 750 W/kg and higher and preferably from 600 to 900 W/kg, supporting a high discharge rate up to 5 C at 5V nominal operational voltage per/cell with operation voltage values at +4.75V.

The novel class of 5V all solid-state lithium batteries are safe because the SSEs are fire resistant with less internal heat generation and lower thermal runaway risk. The batteries have long service lives (e.g., 500 to 1500 cycles, <2% irreversible loss/month) and operate efficiently over a wide temperature range with good working capabilities at both low and elevated temperatures ranges. The batteries have working voltages of up to 5.5 V or higher and preferably from 3.7 to 5.1V.

Battery systems employing the 5V ASSLiB$_S$ cells have numerous military applications including portable electronics, aircraft (manned/unmanned), communications, and engine start/silent watch/emergency power on ground/sea vehicles. The 5V electrochemical cells are light weight and compact and afford excellent reliability and safety in the development of the next generation electronic devices.

BRIEF DESCRIPTION OF THE DRAWINGS

FIGS. 1A, 1, and 1C depict measured ionic conductivities at room temperature of crosslinked P(VDF-HEP)/Sulfolane/LiTFSI polymer electrolyte membranes (PEMs) vs. concentration of one of the components.

FIG. 1D is a ternary phase diagram for uncured ternary mixtures of P(VDF-HEP)/Sulfolane/LiTFSI at room temperature.

DETAILED DESCRIPTION OF PREFERRED EMBODIMENTS

This invention is directed to SSEs that are used in lithium-ion electrochemical cells and batteries. The novel SSEs exhibit high ionic conductivity over a wide temperature window and excellent electrolyte-electrode interface interaction. The fire resistant, non-flammable novel class of SSEs are particularly suited for use in various battery applications from the battery cells to integrated battery systems. The SSE is composed of (i) poly(vinylidene fluoride-co-hexafluoropropylene) P(VDF-HFP) polymer (ii) a plasticizer comprising sulfolane, (iii) ceramic nanoparticles and (iv) a lithium salt. For use in electrochemical cells and batteries, the SSE is typically 10 to 200 μm and preferably 20 to 100 μm thick.

P(VDF-HFP) is a copolymer of PVDF and HFP. VDF-based polymers are superior flame and electrochemical resistant. These highly nonreactive thermoplastic fluoropolymers exhibit high antioxidative abilities and good dielectric constants due to the presence of electron withdrawing functional groups. SSEs incorporating PVDF-HFP exhibits improved mechanical properties, reduced crystalline phase, decreased glass transition temperatures, and increased immobilization. PVDF-HFP is electrochemically stable below 6V. The SSE typically comprises 10 to 50 wt % and preferably 5 to 25 wt % P(VDF-HFP).

Sulfolane is a cyclic sulfone $(CH_2)_4SO_2$ and is the liquid organosulfur plasticizer in the SSEs. Its presence in the polymer based solid electrolyte improves the mechanical characteristics including decreased viscosity and material friction during handling and increased material flexibility and plasticity. The SSE typically comprises 10 to 45 wt % and preferably 30 to 40 wt % sulfolane.

The ceramic nanoparticles have diameters that range from 10 to 2000 nm and have the basic formula $Li_7La_3Zr_2O_{12}$ (LLZO) and its dopant derivatives, such as $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Incorporating ceramic nanoparticles enhances the mechanical strengths of polymer electrolytes and suppresses Li dendrite growth, which significantly improves the cycling stability of batteries. Moreover, nano-sized ceramic particles have excellent miscibility with the polymer materials and the particles afford ionic transport channels which facilitate ion transport within the ceramic-polymer solid electrolyte layer. The SSE typically comprises 5 to 40 wt % and preferably 10 to 25 wt % ceramic nanoparticles.

The lithium salt can comprise any lithium salt suitable for solid lithium electrochemical cells. These include, for example, bis (trifluoromethane) sulfonimide lithium salt (LiTFSI), lithium hexafluorophosphate ($LiPF_6$), lithium hexafluoroarsenate ($LiAsF_6$), $LiClO_4$, lithium bis(oxalato) borate (LiBOB), and mixtures thereof. In preferred SSEs, LiTFSI is the only lithium salt present. The SSE typically comprises 10 to 50 wt % and preferably 20 to 40 wt % lithium salt.

Alternatively, the precursor suspension can be coated onto a thin porous separator layer and upon drying the suspension creates an SSE film that is adhered to a surface of the separator layer, which serves a support substrate. This SSE/substrate assembly can be used in cells and batteries. The separator layer can be a porous polymer mesh or membrane. For use in electrochemical cells and batteries, for this SSE/substrate assembly, the SSE film is typically 10 to 200 μm and preferably 10 to 100 μm thick and the substrate is a film that is 10 to 100 μm and preferably 15 to 50 μm.

The separator material may comprise a microporous polyolefin such as polyethylene (PE), polypropylene (PP), or a blend of PE and PP, or multi-layered structured porous films of PE and/or PP. Commercially available polyolefin porous membranes include CELGARD 2500 (a monolayer polypropylene separator) and CELGARD 2320 (a trilayer polypropylene/polyethylene/polypropylene separator) available from Celgard LLC (Charlotte NC). The microporous polymer separator may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, polyaramides, and polyphenylene oxide and combinations thereof.

As another alternative, the precursor suspension is infiltrated into a separator medium layer before being cured to form a composite SSE in which a polymeric medium comprising a first polymer matrix is impregnated with the SSE. The composite SSE has a thickness that ranges from 10 to 200 μm and preferably from 20 to 100 μm. To prepare this composite SSE, a suspension containing P(VDF-HFP), LiTFSI, sulfolane, and LLZO is prepared by initially dissolving P(VDF-HFP) in heated acetone with magnetic stirring for 30 min. to form an approximate 10 w % to 50 wt % solution. LiTFSI and sulfolane are then added into the P(VDF-HFP) solution and the resulting solution stirred for 30 to 60 min. before the LLZO is added into the solution to form a suspension that is stirred for an addition 30 min. to yield a precursor suspension or slurry. The amounts of LiTFSI, sulfolane, and LLZO added to the initial P(VDF-HFP) solution depends on the desired final concentrations of these components in the SSE that is formed after curing to remove the acetone. A monolayer polypropylene separator (CELGARD 3501) is immerged into the precursor suspension and dry overnight until acetone has fully evaporated. The high voltage composite SSE is then ready to use.

In order to produce SSEs with high ionic conductivities, it is necessary to incorporate the correct balance of the P(VDF-HFP) polymer, sulfolane, ceramic nanoparticles and lithium salt.

Figures 1A, 1B, 1C, 1D:
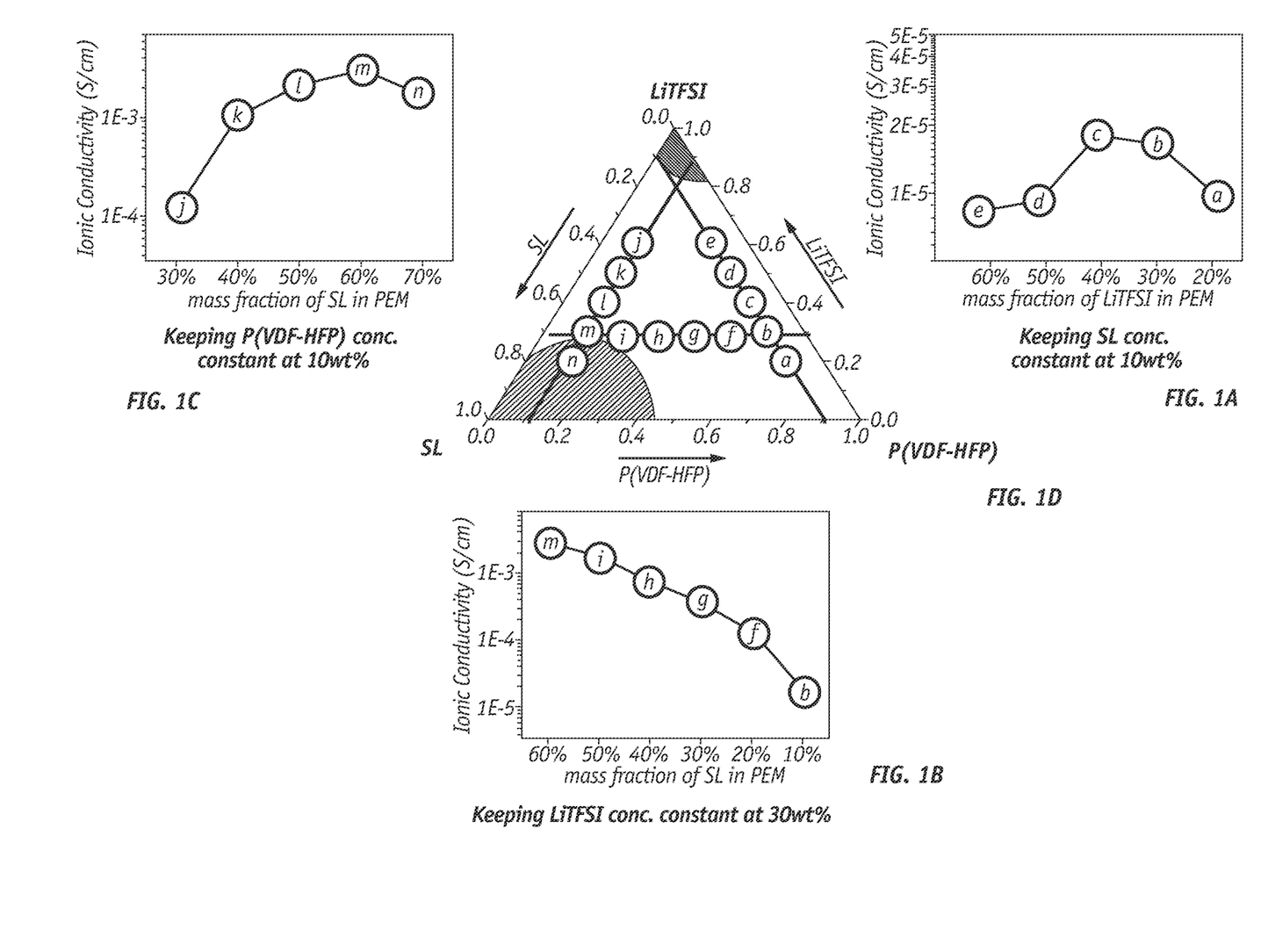

FIG. 1A is a graph of ionic conductivity of a polymer electrolyte membrane vs. mass fraction of LiTFSI in the membrane which consists of P(VDF-HFP), LiTFSI, and sulfolane (SL). The sulfolane concentration in the membrane is kept constant at 10 wt %.

FIG. 1B is a graph of ionic conductivity of the membrane vs. mass fraction of SL in the membrane. The LiTFSI concentration in the membrane is kept constant at 30 wt %.

FIG. 1C is a graph of ionic conductivity of the membrane vs. mass fraction of SL in the membrane. The P(VDF-HFP) concentration in the membrane is kept constant at 10 wt %.

FIG. 1D is a ternary phase diagram for ternary P(VDF-HFP), LiTFSI, and SL mixtures at room temperature. Fourteen data points in the diagram are designated with letters "a" through "n" in the ternary phase diagram; in each of FIGS. 1A, 1B an 1C corresponding positions for some of 14 data points are shown. In the ternary phase diagram, the wide, unshaded intermediate region define the isotropic phase of the mixtures. Amorphous mixtures within this region can be readily photopolymerized at room temperature to fabricate a PEM. However, in this region, the ionic conductivities can be very sensitive to the weight fractions of the system, P(VDF-HFP)/LiTFSI/SL. For example, it is of particular interest that from point b to point f, the ionic conductivity increases by one order of magnitude with only a 10% increase in SL concentration (i.e., 10% decrease in P(VDF-HFP) concentration). In addition, the PEM with the highest salt concentration (i.e., 10/60/30 P(VDF-HFP)/LiTFSI/SL, point j) shows an ionic conductivity of $1\times10^{-4}$ S/cm, which is about one order of magnitude higher than that of point e (30/60/10 P(VDF-HFP)/LiTFSI/SL) in FIG. 1A, which has the same salt level but has a lower plasticizer level.

During the curing process, the presence of the LLZO nanoparticles prevent the P(VDF-HFP) from developing into a crystalline phase. That is, in the SSE which is formed, the P(VDF-HFP) is in an amorphous phase with LLZO nanoparticles, lithium salt and sulfolane distributed in the polymer matrix. The SSE with the amorphous polymer phase exhibit higher ionic conductivities that those having a crystalline polymer phase. The LLZO contributes to mechanical properties of the SSE and also function as tough ceramic fillers that inhibit lithium dendrite growth during operation of lithium-ion cells and batteries.

The SSE of the present invention has an ionic conductivity of greater than $1\times10^{-3}$ S/cm (at or above room temperature of 20° C.) and preferably has an ionic conductivity of $1.5\times10^{-3}$ S/cm to 4.0 S/cm. The SSE has a wide electrochemical window of up to 5.8V. In addition, the electrolyte is thermally stable of up to 170° C. Finally, the electrolyte shows low interfacial resistance, good compatibility with both lithium metal and cathode materials, and enhanced mechanical strength with a Young's modulus of compression from 1 to 100 MPa and preferably exceeds 50 MPa.

Figure 2:
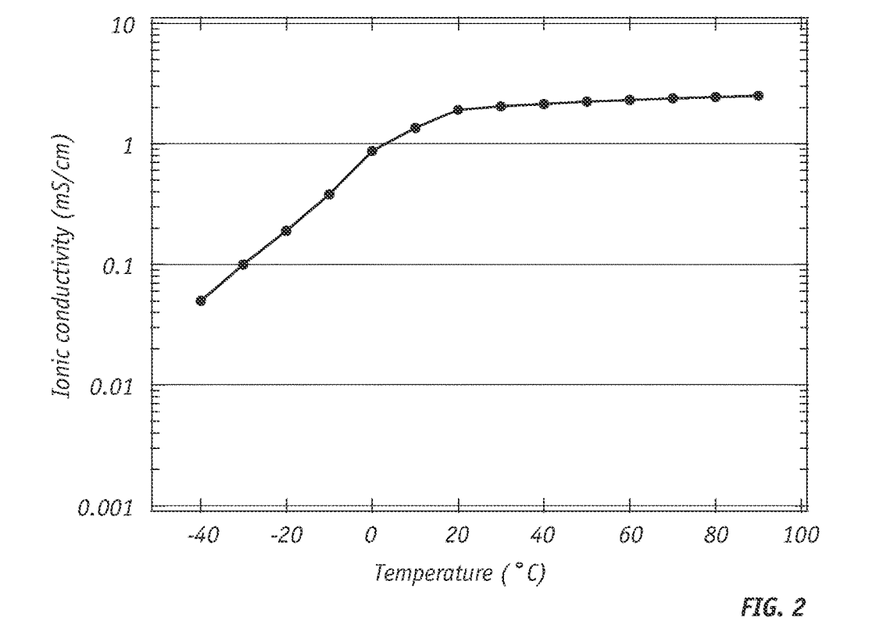
FIG. 2 is a graph of ionic conductivity vs. temperature for an SSE.

FIG. 2 is the ionic conductivity of a representative SSE as measured over a temperature range of −40° C. to 90° C. The free-standing SSE film (sample 1) was 60 μm thick and consisted of 15 wt % P(VDF-HFP), 40 wt % sulfolane, 15 wt % LLZO ceramic nanoparticles and 30 wt % LiTFSI. In the graph, the temperature range above 30° C. is defined as the high temperature region, while temperature below 0° C. is defined as the low temperature region. At −40° C., the ionic conductivity is 0.05 mS/cm and from −40° C. to −20° C., the ionic conductivity increased rapidly to about 2 mS/cm, which is attributed to the glass transition behavior of the P(VDF-HFP) polymer. From 20° C. to 90° C., the ionic conductivity increased slightly to about 2.5 S/cm. The SSE can work effectively at a wide temperature range from −40° C. to 90° C.

The above sample 1 SSE was non-flammable and fire-resistant. Sample 1 was exposed to flames from a propane torch for 5 seconds in a fire-retardant test. The SSE did not become inflamed and showed good structural integrity and was not burnt out.

Figure 3A:
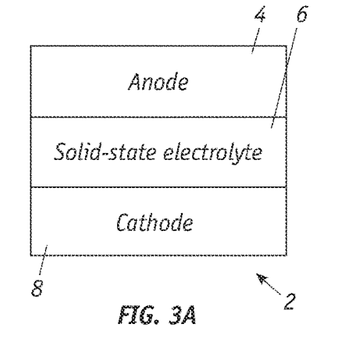
FIGS. 3A and 3B are cross-sectional illustrations of electrochemical cells.

The SSEs of the present invention are incorporated into electrochemical cells. FIG. 3A depicts a lithium-ion electrochemical cell 2 that comprises an anode 4, cathode 8, and the SSE 6 interposed in-between. Alternatively, the SSE can be a composite SSE in which a polymeric medium comprising a first polymer matrix is impregnated with the SSE.

Figure 3B:
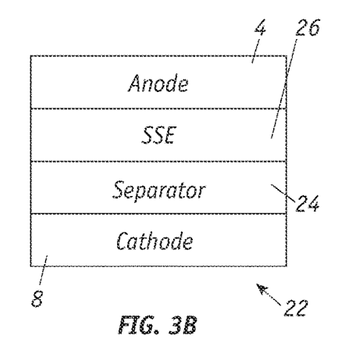

FIG. 3B depict another lithium-ion electrochemical cell 22 with anode 4, cathode 8 and SSE 26 that is supported on separator substrate 24.

Electrochemical batteries comprise a plurality of electrochemical cells which are connected in series, in parallel, or both in series and in parallel.

Anodes comprise an anode active material, a conductive agent and a binder. The active materials for anodes include any compatible anodic material which functions as an anode in solid lithium-ion electrochemical cells. Preferred anode active materials are graphite based and silicon-based materials. The conducting agent is an electronically conductive material that is preferably made of carbon, in particular elemental carbon. The electronically conducting agent can be, for example, carbon black. Binders such as polyvinylidene fluoride (PVDF) and polyacrylic acid (PAA) can be used as necessary. PVDF is used if the weight ratio of active material is high.

Cathodes comprise a cathode active, a conductive agent and a binder. The active materials for cathodes include any compatible cathodic material which functions as a positive pole in a solid lithium electrochemical cell. Preferred cathode active materials which are compatible with the polymer-based electrolyte comprise, for example, LiFePO4 (LFP), $LiNi_{0.8}Co_{0.1}Mn_{0.1}O_2$ (NCM811), $LiNi_{0.5}Co_{0.2}Mn_{0.3}O_2$ (NCM 523), $LiNi_{0.6}Co_{0.2}Mn_{0.2}O_2$ (NCM622), Olivine-type lithium cobalt phosphate LiCoPO4 (LCP), nickel-cobalt lithium aluminate LiNiCoAlO2 (NCA), LiMPO4 (M=Ni, Co, Mn, and Fe) and their derivatives, and mixtures thereof. Olivine LCP is a good cathode material for high-voltage Li-ion batteries due to its high redox potential (4.8 V vs. Li/Li+) and high capacity (167 mAh/g). NCM 811 ($_{4.3}$ V vs. Li/Li+) is a high-nickel layered oxide. It offers higher energy density than their low-nickel counterparts.

The conducting agent is preferably made of carbon such as carbon black. Binders such as PVDF and PAA can be used as necessary. PVDF is used if the weight ratio of active material is high.

Figure 4:
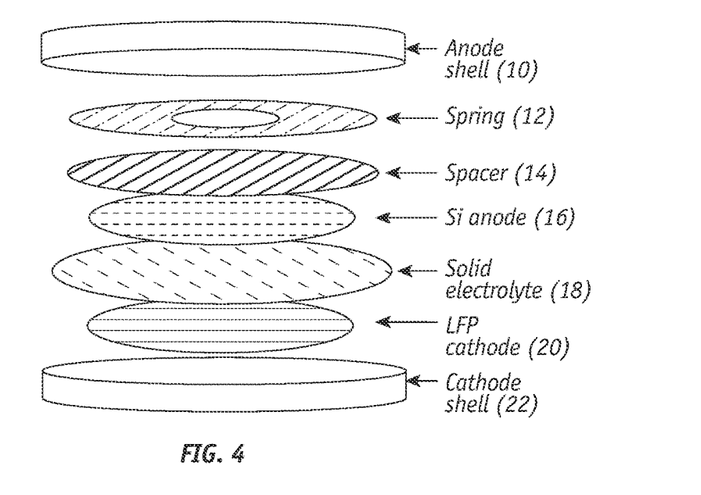
FIG. 4 is an exploded schematic view of a coin cell.

The electrochemical performance of the above sample 1 composite SSE was tested by constructing electrochemical cell as illustrated in FIG. 4. As shown, the assembled lithium electrochemical coin cell has anode shell 10, spring 12, spacer 14, composite solid electrolyte 18, and cathode shell 22. Crimping encases the entire structure includes a plastic gasket which electronically separates the shells. A high-pressure crimper typically applies a pressure of about 100 to 1200 psi. The intimated contacts afford good ion transport and reduce interface resistance. Electrochemical cells can be stacked into batteries. The anode shell and cathode shell serve as current collectors on the exterior surfaces of cathode and anode. The shells preferably have planar external surfaces. Coin cells containing high-voltage SSE, LiMn$_{1.5}$Ni$_{0.5}$O$_2$(LMNO) cathode, and lithium metal electrode were evaluated.

Figure 5A:
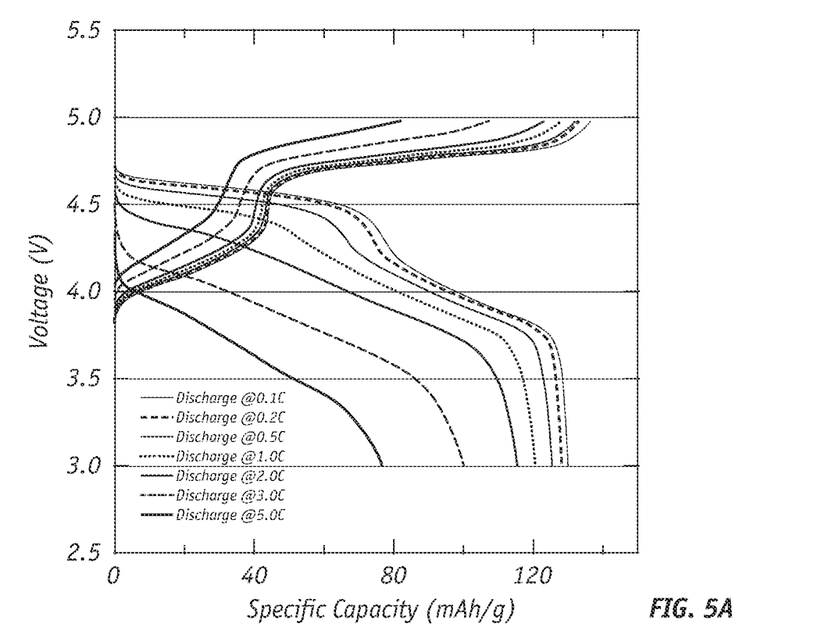
FIG. 5A a graph of voltage vs. specific capacity from a rate performance test (from 0.1 C to 5 C) for LMNO/Li coin cells.

FIG. 5A shows the charge-discharge curves of LMNO/Li metal coin cells using the sample 1 SSE. The cell was discharged at different C-rates to characterize the rate performance in both low-rate and high-rate. The coin cell exhibited highest specific capacity of 130 mAh/g when it was discharged at 0.1 C. After the discharging C-rate was increased to 0.2 C, 0.5 C, 1 C, 2 C, 3 C, and 5 C, the discharge capacity was 130 mAh/g, 128 mAh/g, 125 mAh/g, 121 mAh/g, 115 mAh/g, 100 mAh/g and 77 mAh/g, respectively, which is due to the moderate ionic conductivity of the electrolyte layer. The interactions between electrolyte layer and the anode and cathode materials at their interfaces influence the cycling stability of coin cells.

Figure 5B:
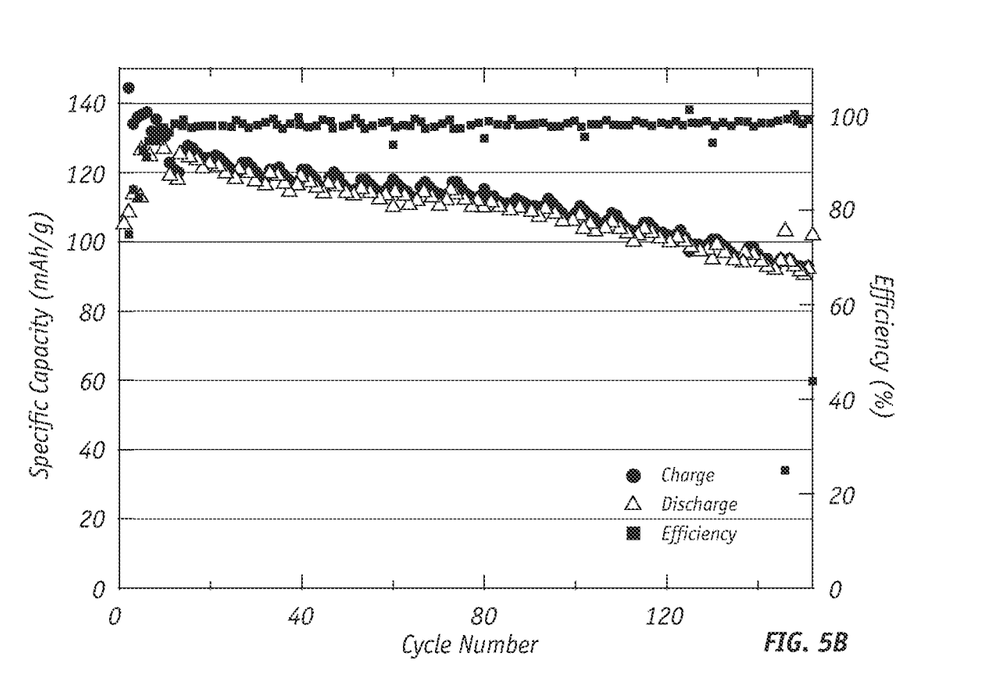
FIG. 5B is a graph of specific capacity vs. cycle number from a cycling stability test (charge and discharge at 0.5 C) for LMNO/Li coin cells.

FIG. 5B shows the results of a cycling stability test of the above LMNO/Li metal cell, where the cell was charged and discharged at 0.5 C. The coulombic efficiency of the cell was kept almost at 100% during the test. By further increasing the cycling number to 150, it was shown that the coin cell possessed 80% of its performance.

Figure 6A:
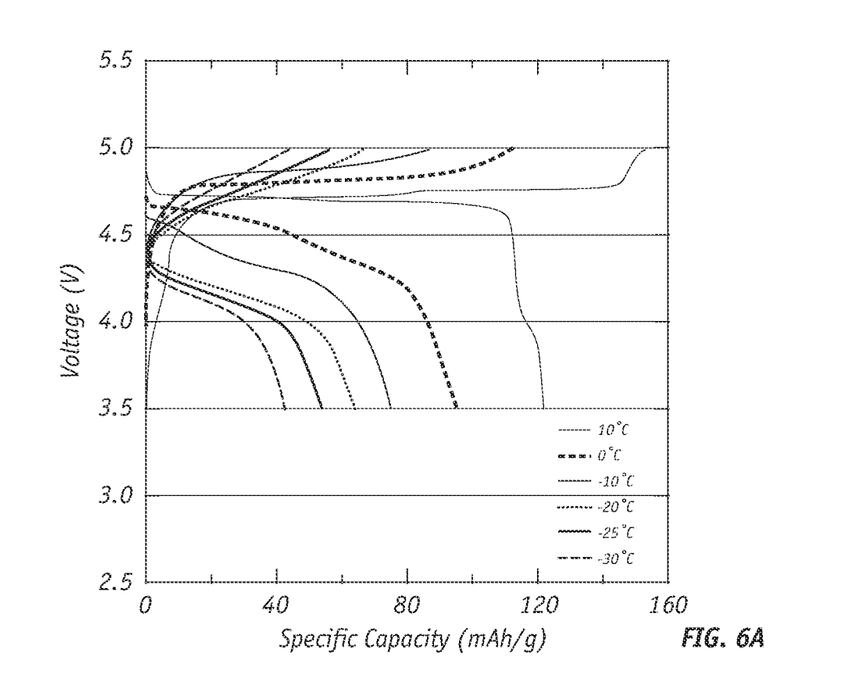
FIG. 6A is a graph of voltage vs. specific capacity charge and discharge curves for LMNO/Li coin cells as measured at a low temperature range.
Figure 6B:
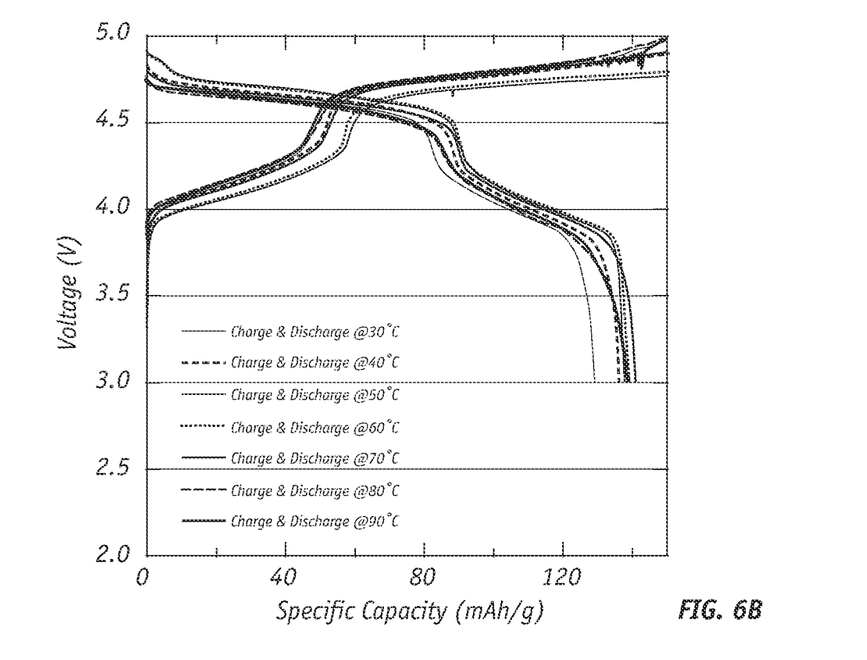
FIG. 6B is a graph of voltage vs. specific capacity charge and discharge curves for LMNO/Li coin cells as measured at a high temperature range.

LMNO/Li metal coin cells with the sample 1 SSE were tested over a temperature range of −40° C. to 90° C. The charge and discharge curves for low and high temperature data are presented in FIG. 6A and FIG. 6B, respectively. All cells were charged and discharged at 0.1 C. The cells exhibited negligible specific capacity at −40° C. so those curves were not included. The data showed that as the temperature decreased from 10° C. to −30° C., the specific capacities of the cells decreased from 121 mAh/g to 44 mAh/g, respectively. This reduction in specific capacity at low temperatures is consistent with the glass transition behavior of P(VDF-HFP) which causes an attendant reduction in the ionic conductivity in the composite SSE. When the cells operated at the high temperature range of from 30° C. to 90° C., the specific capacities varied only slightly as the values were between 130 mAh/g and 142 mAh/g.

Full electrochemical cells with the sample 1 high-voltage SSE, silicon or graphite anode, and lithium metal electrode were also evaluated. Silicon has a theoretical capacity of about 4,200 mAh/g which is approximately 10 times higher than that of graphite anodes in Li-ion batteries. However, silicon's significant volume changes of about 300% during charge and discharge can cause the silicon particles to crack or become isolated; the loss of active material results in continuous capacity losses and poor cycling performance. In a cell of an all solid-state lithium ion battery, the electrode material is sandwiched between two solid components (i) an SSE separator layer and (ii) a metal current collector. In particular, within the anode layer, silicon particles are surrounded by the soft polymer-based electrolyte that confines and absorbs its volume change, enabling excellent electrode performance.

Figure 7A:
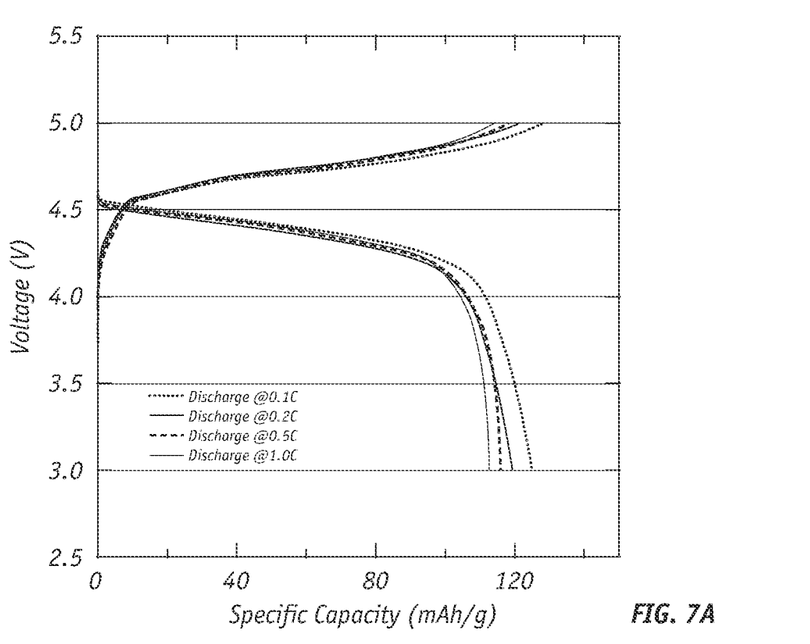
FIG. 7A is a graph of voltage vs. specific capacity with discharge curves for LMNO/Graphite coin cells.
Figure 7B:
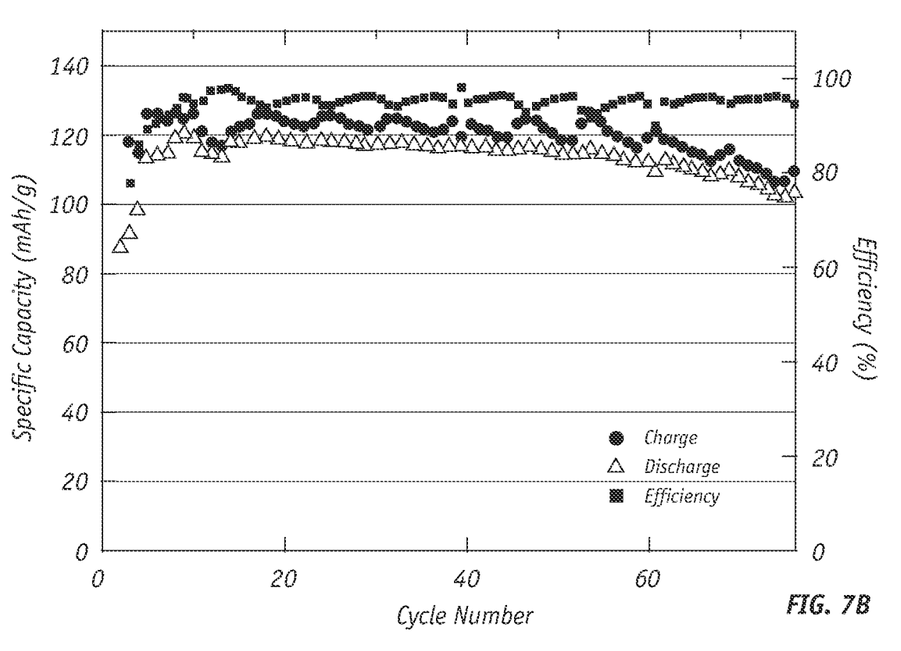
FIG. 7B is a graph of specific capacity vs. cycle number from a cycling stability test for LMNO/Graphite coin cells.

The test results for LMNO/graphite full electrochemical cells are shown in FIGS. 7A and 7B. For the LMNO/SE/graphite full-cell coin cells, the sample 1 SSE formulation was used. When the discharge C-rate was increased from 0.1 C to 1.0 C, the specific discharge capacity was around 120 mAh/g without large variations. For the cycling stability test, the coin cell was charged and discharged at 0.5 C. The cell was able to retained 90% of capacity after 70 cycles.

Figure 8A:
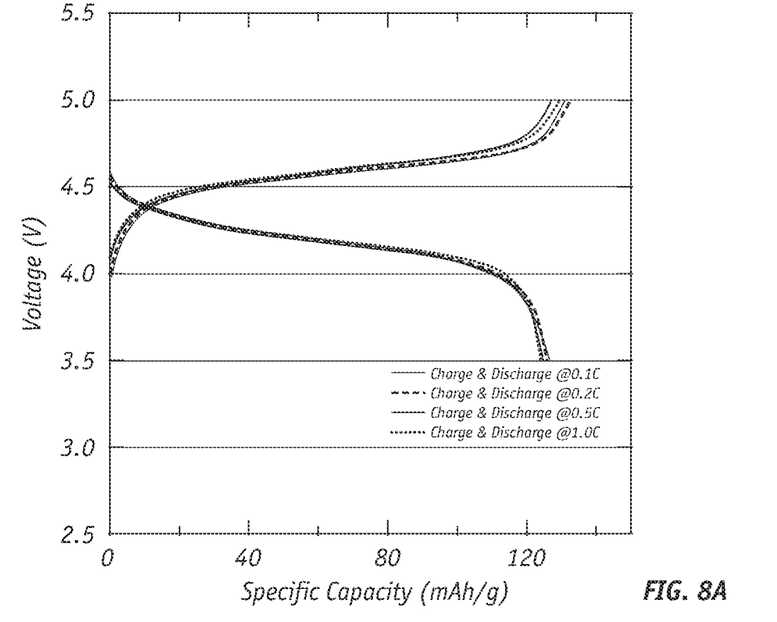
FIG. 8A is a graph of voltage vs. specific capacity with charge and discharge curve for LMNO/Si coin cells.
Figure 8B:
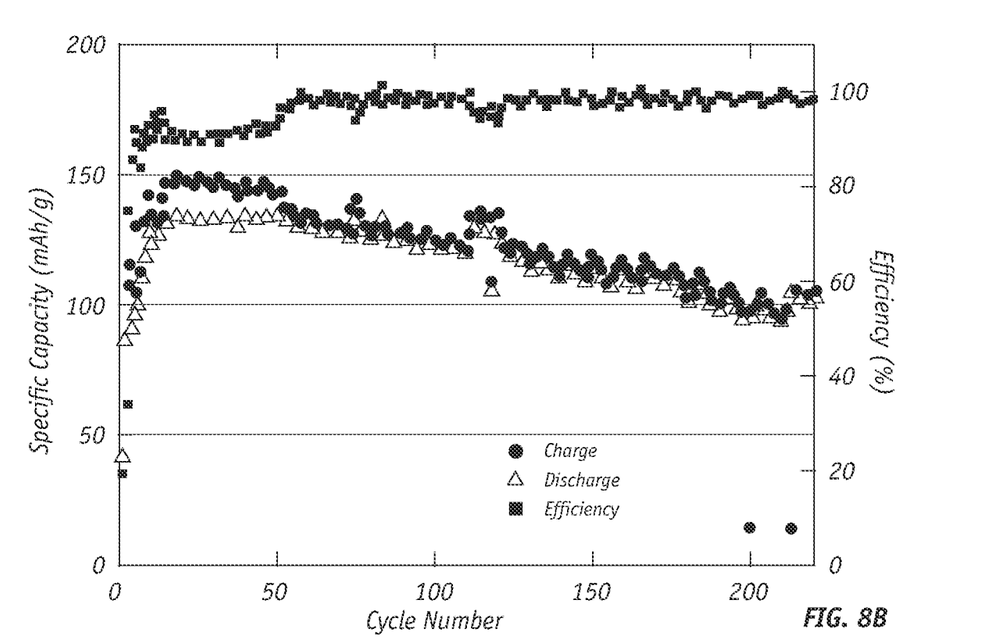
FIG. 8B is a graph of specific capacity vs. cycle number from a cycling stability test for LMNO/Si coin cells.

The text results for LMNO/Si full-cell coin cells are shown in FIGS. 8A and 8B. Under the rate performance test, when the discharge rate was increased from 0.1 C to 1.0 C, the discharge capacity was about 120 mAh/g. This result showed no significant capacity fade as compared to the LMNO/Li coin cell. The LMNO/Si full cell was charged and discharged at 0.5 C for the cycling stability test. Coin cells with silicon anodes exhibited higher specific capacity (50% more) and good cycling stability of up to about 150 cycles with a 95% capacity retention.

Figure 9A:
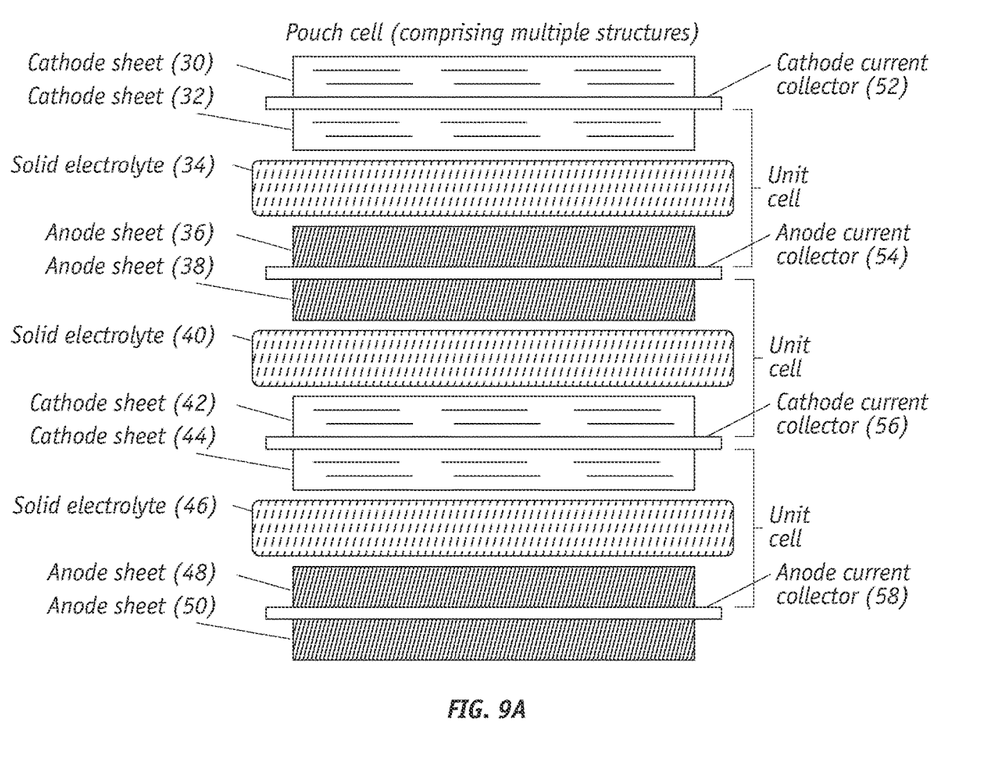
FIG. 9A is cross sectional view of a pouch cell.
Figure 9B:
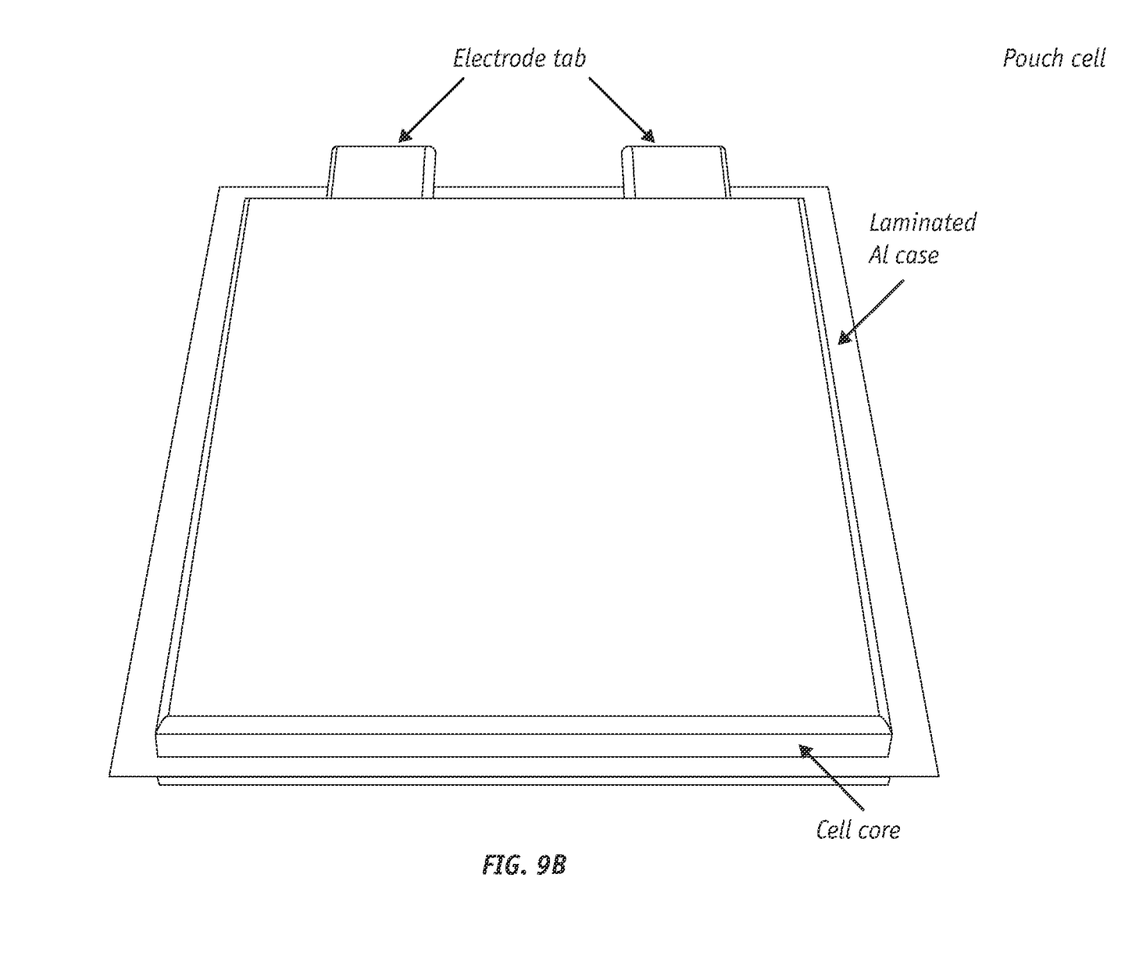
FIGS. 9B and 9C are side and perspective views of an assembled pouch cell.
Figure 9C:
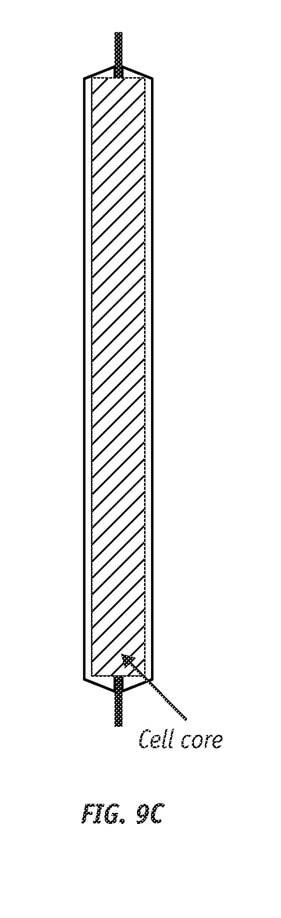

Pouch cells comprising LMNO, SSE, and silicon also demonstrated high capacities and energy densities. As shown in FIG. 9A, the pouch cell includes cathode currently collectors 52, 56, LNMO cathodes 30, 32, 42, 44, graphite or silicon anodes 36, 38, 48, 50 anode current collectors 54, 58 and SSEs 34, 40, 46 that are positioned between cathodes and anodes. Typically, one cathode sheets, one anode sheets and one SSE layer is defined as a single unit-cell. The above structure is enclosed inside laminated aluminum film which is the pouch cell case. Pouch cell can comprise a plurality of from 5 to 50 connected unit cells. FIGS. 9B and 9C are side and perspective views of an assembled pouch cell. The dimensions of the pouch cells were 6.3 cm×4.7 cm×9.3 cm. The optimized mass energy density and volume energy density of all solid-state pouch cell prototype could reach over 250 Wh/kg and 450 Wh/L and preferably from 200 to 300 Wh/kg and 400 to 700 Wh/L, respectively. The pouch cells consisted of 50 unit-cell structures and for each cell, the SSE membrane (sample 2) positioned between anode and cathode comprised 15 wt % P(VDF-HFP), 30 wt % LiTFSI, 40 wt % sulfolane, and 15 wt % LLZO. The SSE film was fabricated by tape casting an electrolyte slurry onto a polypropylene membrane followed by drying.

Figure 10:
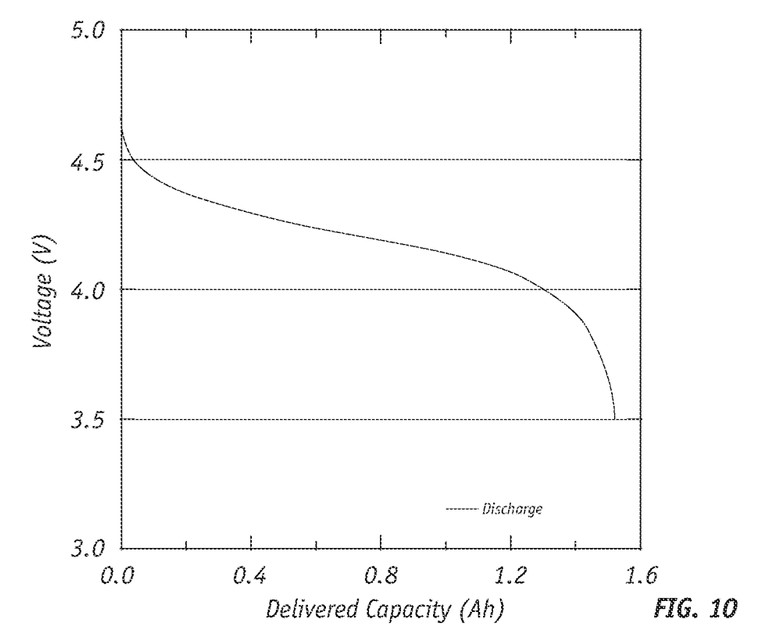
FIG. 10 is a graph of voltage vs. delivered capacity with discharge profiles for LMNO/Si pouch cells.

FIG. 10 shows the rate performance of a pouch cell consisting of 50 unit-cell in parallel connection. When the pouch cell was charged and discharged at 0.1 C, the delivered capacity was about 1.5 Ah, with the weight energy capacity of about 150 Wh/kg and volume energy capacity of about 270 Wh/L.

Figure 11:
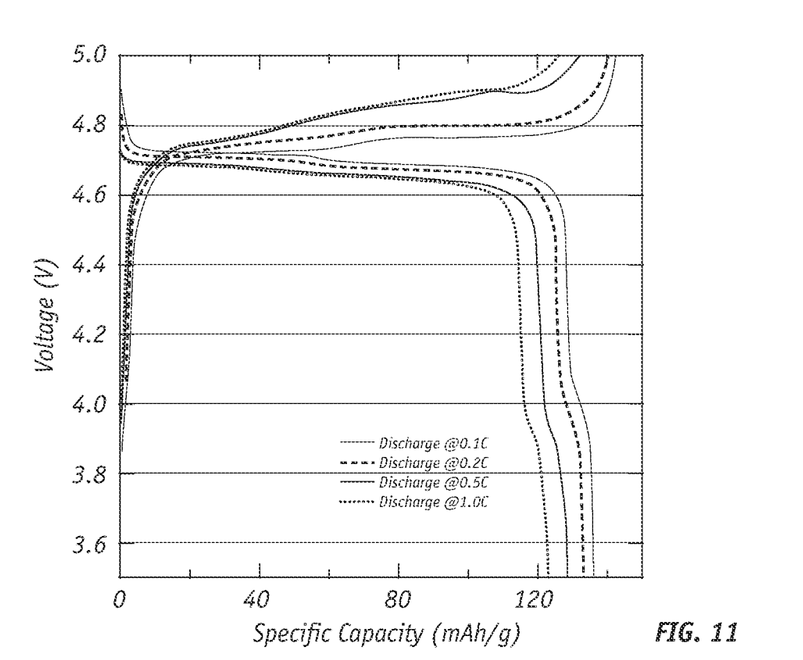
FIG. 11 is a graph of voltage vs. specific capacity with charge and discharge curves for LCP/Li coin cells

High-voltage LCP coin cells (half-cell) with the LCP/SSE/lithium structure were evaluated. The SSE (sample 3) comprised 15 wt % P(VDF-HFP), 30 wt % LiTFSI, 40 wt % sulfolane, and 15 wt % LLZO. As shown in the FIG. 11, the P(VDF-HFP) based electrolyte worked well with the high voltage (5V) LCP cathode. The discharge curves for 0.1 C, 0.2 C, 0.5 C, and 1.0 C (at 22 cycles) showed that all the discharge capacities were higher than 120 mAh/g.

Figure 12:
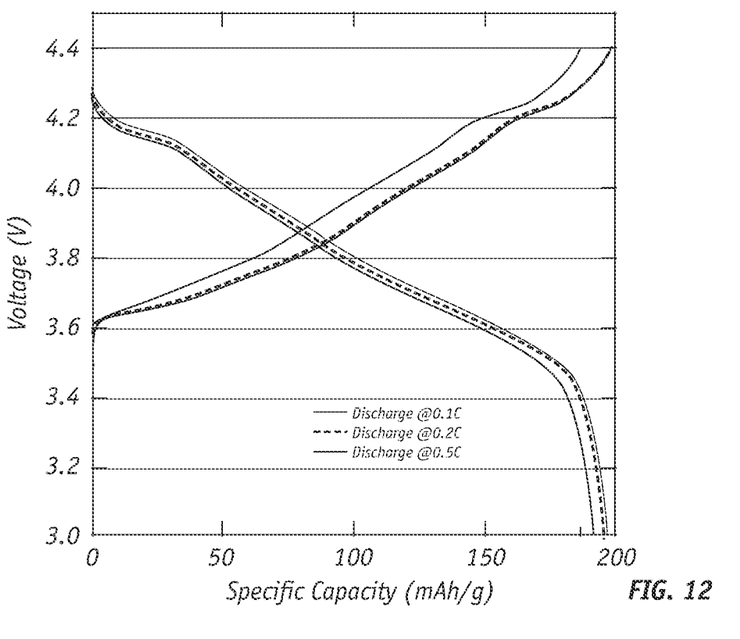
FIG. 12 is a graph of voltage vs. specific capacity with discharge curves for NCM811/Li coin cells.

Coin cells (half cells) using LiNi$_{0.8}$Co$_{0.1}$Mn$_{0.1}$O$_2$ (NCM811) cathode with the structure NCM811/SSE (sample 3)/lithium were also investigated. The electrolyte also worked well with the high voltage, high capacity NCM811. As shown in FIG. 12, the capacity for NCM811 cell was close to 200 mAh/g.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A solid-state electrolyte that comprises (i) a polymer matrix that comprises poly (vinylidene fluoride-co-hexafluoropropylene) P (VDF-HFP), (ii) a plasticizer that comprises sulfolane (SL), (iii) a lithium salt, and (iv) ceramic nanoparticles with diameters that range from 10 to 2000 nm that are distributed in the polymer matrix, wherein the ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$ wherein the P (VDF-HFP) polymer matrix, the sulfolane plasticizer and the lithium salt form a ternary complex with the P (VDF-HFP) polymer matrix having an amorphous polymer microstructure.

2. The solid-state electrolyte of claim 1 comprising 10 to 50 wt % P(VDF-HFP) based polymer, 10 to 45 wt % SL based plasticizer, 10 to 50 wt % lithium salt, and 5 to 40 wt % LLZO based ceramic nanoparticles.

3. The solid-state electrolyte of claim 1 forms a membrane that has an ionic conductivity of higher than 1×10-3 S/cm when measured at a temperature 20° C., or higher.

4. The solid-state electrolyte of claim 1 forms a membrane that has a compressive strength of 1 to 100 MPa.

5. The solid-state electrolyte of claim 1 forms a film which is fire-resistant and non-flammable.

6. The solid-state electrolyte of claim 1 forms a film that is free standing and has a thickness that ranges from 10 to 200 μm.

7. The solid-state electrolyte of claim 1 wherein the solid-state electrolyte is a film that is coated onto a separator layer comprising a polymer mesh or membrane.

8. The solid-state electrolyte of claim 1 comprising a separator layer comprising a polymer mesh or membrane wherein the solid-state electrolyte is impregnated in the separator layer.

9. The solid-state electrolyte of claim 1 wherein the polymer matrix consists of P(VDF-HFP) and the plasticizer consists of sulfolane.

10. The solid-state electrolyte of claim 1 wherein the lithium salt is selected from the group consisting of LiTFSI, $LiClO_4$, $LiPF_6$, $LiAsF_6$, LiBOB, and mixtures thereof.

11. The solid-state electrolyte of claim 1 wherein the ceramic nanoparticles comprise $Li_7La_3Zr_2O_{12}$.

12. An all-solid-state lithium-ion electrochemical cell which comprises:

an anode, a cathode, and interposed between therebetween a solid-electrolyte that comprises: (i) a polymer matrix that comprises poly (vinylidene fluoride-co-hexafluoropropylene) P(VDF-HFP), (ii) ceramic nanoparticles with diameters that range from 10 to 2000 nm that are distributed in the polymer matrix, (iii) a plasticizer that comprises sulfolane and (iv) a lithium salt, wherein the ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$, wherein the polymer matrix is an amorphous polymer matrix, and the ceramic materials are distributed within the amorphous polymer matrix.

13. The electrochemical cell of claim 12 which has an energy density of at least about 250 Wh/kg.

14. The electrochemical cell of claim 12 which is capable of outputting a voltage of 4.1 volts to 5.1 volts.

15. The electrochemical cell of claim 12 which has a power density of at least about 750 W/kg.

16. The electrochemical cell of claim 12 wherein the anode comprises lithium, silicon or graphite and mixtures thereof.

17. The electrochemical cell of claim 12 wherein the cathode comprises a material that is selected from the group consisting of $LiNi_{0.8}Co_{0.1}Mn_{0.1}O_2$ (NCM811), $LiNi_{0.6}Co_{0.2}Mn_{0.2}O_2$ (NCM 622), $LiNi_{0.5}Co_{0.2}Mn_{0.3}O_2$ (NCM523), $LiNiCoAlO_2$ (NCA), $LiMn_{1.5}Ni_{0.2}O_2$ (LMNO), and $LiMPO_4$ wherein M is Ni, Co, Mn, or Fe, and mixtures thereof.

18. A process for preparing an ASSB cell which comprises: (a) providing an anode; (b) providing a cathode; and (c) positioning a solid-state electrolyte between the cathode and anode, wherein the solid-state electrolyte comprises (i) a polymer matrix that comprises poly (vinylidene fluoride-co-hexafluoropropylene) P (VDF-HFP), (ii) a plasticizer that comprises sulfolane, (iii) a lithium salt, and (iv) ceramic nanoparticles with diameters that range from 10 to 2000 nm that are distributed in the polymer matrix, wherein the ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$, wherein the polymer matrix is an amorphous polymer matrix, and the nanoparticles of the ceramic materials are distributed within the amorphous polymer matrix.

* * * * *